United States Patent [19]

Shin

[11] Patent Number: 4,947,457
[45] Date of Patent: Aug. 7, 1990

[54] REMOVABLE FUNCTION BOX WITH CONTACT BLOCK ASSEMBLY

[75] Inventor: Duk W. Shin, Kyungi, Rep. of Korea

[73] Assignee: Namsung Electronics Corp., Rep. of Korea

[21] Appl. No.: 279,957

[22] Filed: Dec. 5, 1988

[30] Foreign Application Priority Data

Oct. 12, 1988 [KR] Rep. of Korea ............... 16738/1988

[51] Int. Cl.⁵ .................................................. H04B 1/06
[52] U.S. Cl. .................................... 455/345; 455/346; 455/348
[58] Field of Search ............... 455/344, 345, 346, 347, 455/348, 349; 358/194.1; 361/422; 439/247, 66, 78, 80, 81, 327; 324/158 F; 312/71

[56] References Cited

U.S. PATENT DOCUMENTS

| | | | |
|---|---|---|---|
| 3,391,383 | 7/1968 | Antes | 324/158 F |
| 3,922,047 | 11/1975 | Tsuji | 312/7.1 |
| 4,068,175 | 1/1978 | Maniaci | 455/345 |
| 4,081,751 | 3/1978 | Maddaloni | 455/345 |
| 4,481,512 | 11/1984 | Tscheulin | 455/346 |
| 4,562,595 | 12/1985 | Bauer et al. | 455/345 |
| 4,640,562 | 2/1987 | Shoemaker | 439/327 |

*Primary Examiner*—Reinhard J. Eisenzopf
*Assistant Examiner*—Andrew Faile
*Attorney, Agent, or Firm*—Ostrolenk, Faber, Gerb & Soffen

[57] ABSTRACT

An audio set includes a main body which is positionable behind a dash board of a car, a nose piece which extends through the dash board and a trim plate which is positionable in front of the dash board. The set also includes a function box which fits within and is removable from a recess. The set also includes a contact block assembly which includes a connector pin for electrically connecting the function box to an electrical component within the main body when the function box is located within the recess. The pin is covered and protected when the function box is removed from the recess.

17 Claims, 5 Drawing Sheets

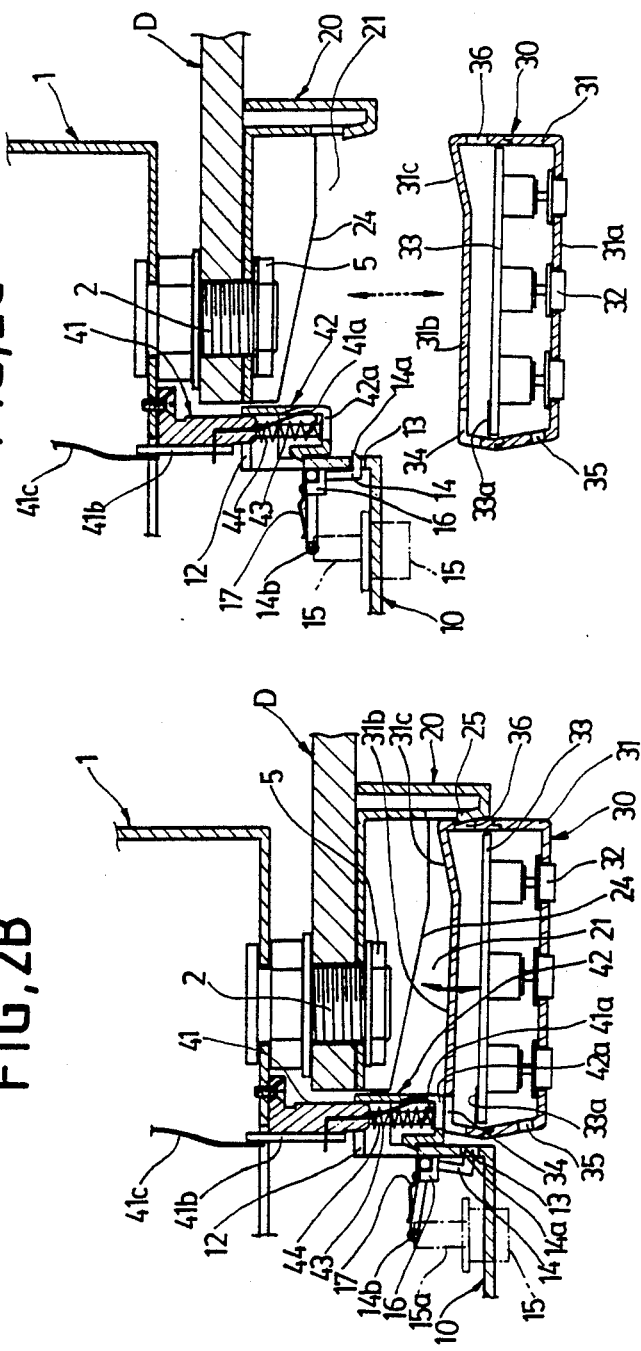

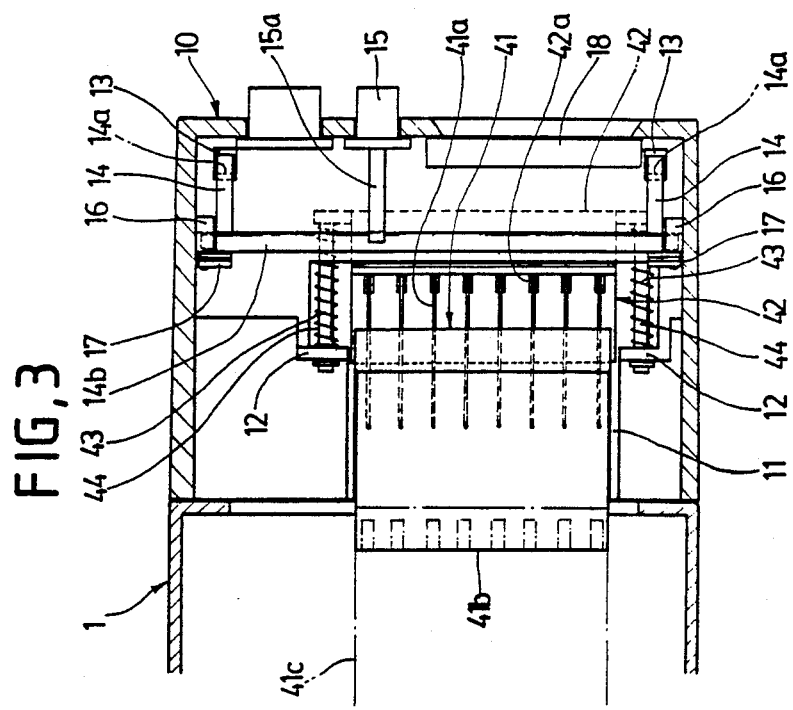

4,947,457

REMOVABLE FUNCTION BOX WITH CONTACT BLOCK ASSEMBLY

BACKGROUND OF THE INVENTION

The present invention relates to an extension and separation device of function part of a nose piece for a control knob of a car audio set, and more particularly to an extension and separation device of function part of a nose piece for a control knob of a car audio set which a protruded portion, i.e., a nose piece portion of a car audio set which is set at front of a main body of a car audio set with a limited magnitude, is technically extended so that a new control part or function part can be added, at the same time, the extended function box portion is made to easily separate from or coupled to the nose piece body of a car audio set so that a theftproof effect of the products can be also obtained.

In an audio set for a car which is generally used, it is known a car audio set of a type (Din E Type) which a whole of rectangularly shaped car audio set is inserted with sliding manner from the front of a set hole rearwardly and then fixed in accordance with the shape of the set hole formed at a dash board of a car and the type of an audio set fixed to said set hole, and another type (Two-Shaft Type) of a car audio set which has two control shafts at both sides of a nose piece protruded at the center portion of the front surface and which is inserted from the rearward to the frontward of the dash board and then fixed.

However, among the car audio sets as described above, in case of the two-shaft type car audio set having nose piece, since a protruded portion, i.e., a nose piece of a predetermined magnitude (44 mm×105 mm) arranged on the front of an audio set is inserted to the rectangular set hole of limited magnitude formed on the dash board of a car, and the control shafts of both sides of nose piece are made to insert to the shaft holes formed at both sides of said set hole, in case of a car audio set having such fixing structure, at a front surface of the nose piece exposed to the frontward of set hole, an inserting opening for setting in and drawing our of a tape cassette, various function button switches for handling of a car audio set, and the functioning portion such as a display portion etc. have to be limitedly included.

However, despite of the necessity for including additionally various new functions in accordance with the development of advancing technic, in case of a car audio set of two-shaft type as described hereinbefore, since the magnitude of nose piece having limited size becomes the interrupting factor, there has been the defects and problems that was difficult to additionally arrange various function parts at a front of said nose piece.

On the other hand, recently the theft of a car audio set has been frequently occurred, therefore, some device which is possible to prevent the theft of a car audio set has been proposed and used, but it is a matter of fact that a pertinent theftproof device is not yet provided in case of the two-shaft type car audio set having the setting structure as above-mentioned.

SUMMARY OF THE INVENTION

Therefore, a primary object of the present invention is to provide an extension device of function part of a nose piece for a car audio set which is capable of including or extending additionally the required various function parts technically by extending a protrusion portion, i.e., a nose piece of the front portion of the two-shaft type car audio set main body which can not but only have a limited magnitude upon the given condition of a car audio set setting.

Further object of the present invention is to provide a separation device of function part of a nose piece for a car audio set which the extended function box is structured as a separating type function box which can simply separate from or couple to the nose piece main body itself coupled integrally with a car audio set, and a thief value of a car audio set is limited by making the handling and operating of a car audio set impossible under the condition of the function box being separated, so that the desired theftproof effect can be obtained.

The extention and separation device of function part of a nose piece for a car audio set according to the present invention for achieving the objects as described hereinabove is structured as follows.

A rectangular separte type function box which a plurality of function buttons or extended display portion is included at front is mounted at a side of the control knob setting portion of nose piece body which is exposed through an opening of trim plate attached at the set hole of the dash board of a car and the periphery of front surface of said set hole, i.e., a side of a trim plate attached at the periphery of front surface of a nose piece, and a contact block assembly for the electrical contact between a circuit board of the interior of exposed function box and a circuit board contained in the audio set body is arranged between an interior side of a side wall of nose piece body that said function box being mounted and a side of rear wall of the function box.

Above-described separate type function box, whose one side wall is assembled with the nose piece body in a manner that can be separated voluntarily each other at a state that whose rear surface portion is contacted and supported at an inclind supporting plate formed within a side of interior of a recess of a trim plate mounted fixedly at the front surface of dash board, and each contact piece of the circuit board of the interior of the function box is connected to a plurality of connector pins arranged at the contact block of said contact block assembly.

A contact block of this contact block assembly, whose contact pieces of its end is covered with a contact block cover resiliently fixed with spring with a plurality of the pin holes corresponding to them, thereby in case of coupling the function box, a contact block cover contacted to its rear surface is moved toward inside then each connector pin of the contact block is got to expose toward outside of the contact block cover, at the same time, each exposed connector pin is inserted into the interior of the function box, accordingly the electrical connection between a circuit board contained within an audio set main body and a circuit board of the function box becomes to obtain, and in case of separating the function box, the contact block cover pressed and moved into the inside is reverted so that each connector pin of the contact block end becomes possible to protect.

In the extension and separation device of function part of a nose piece for a car audio set according to the present invention thus structured, a separate type function box is technically extended at one side of nose piece body of an audio set exposedly fixed toward the front of dash board with own body structure of a car audio set and its limited magnitude based on the given condition of establishment, thereby either the various function buttons are additionally included to the extended function box or the desired various displays are added or extendedly displayed, on the other hand, the display setting portion of exsisting nose piece body itself can be applied as a various function button setting portion.

Particularly, the extension and separation device of a nose piece for a car audio set according to the present invention is formed with a structure which the extended function box can be separately coupled with nose piece main body, therefore in case of parking a car, only its function box is simply released and separated thereby the handling and the using are made impossible under the condition its function box being separated, so that a thief value of the whole of a car audio set is made to lose thereby the theftproof effect becomes possible to obtain.

BRIEF DESCRIPTION OF THE DRAWINGS

The above and other objects, features and advantages of the present invention will become more apparent from the following detailed description taken in conjunction with the accompanying drawings, in which:

FIG. 2A to 2C are cross sectional views illustrating the structures and operations of a car audio set according to the present invention, in which, FIG. 2A is a cross sectional view showing the condition that a separate type function box is coupled with a nose piece main body of an audio set;

FIG. 2B is an enlarged partial cross sectional view showing the process that a separate type function box is coupled with or separated from a nose piece in a body of an audio set;

FIG. 2C is a schematic cross sectional view showing the condition that a separate type function box is separated from a nose piece main body of an audio set;

FIG. 3 is a cross sectional view of III—III line of FIG. 2A.

DETAIL DESCRIPTION OF THE INVENTION

Figure 1:
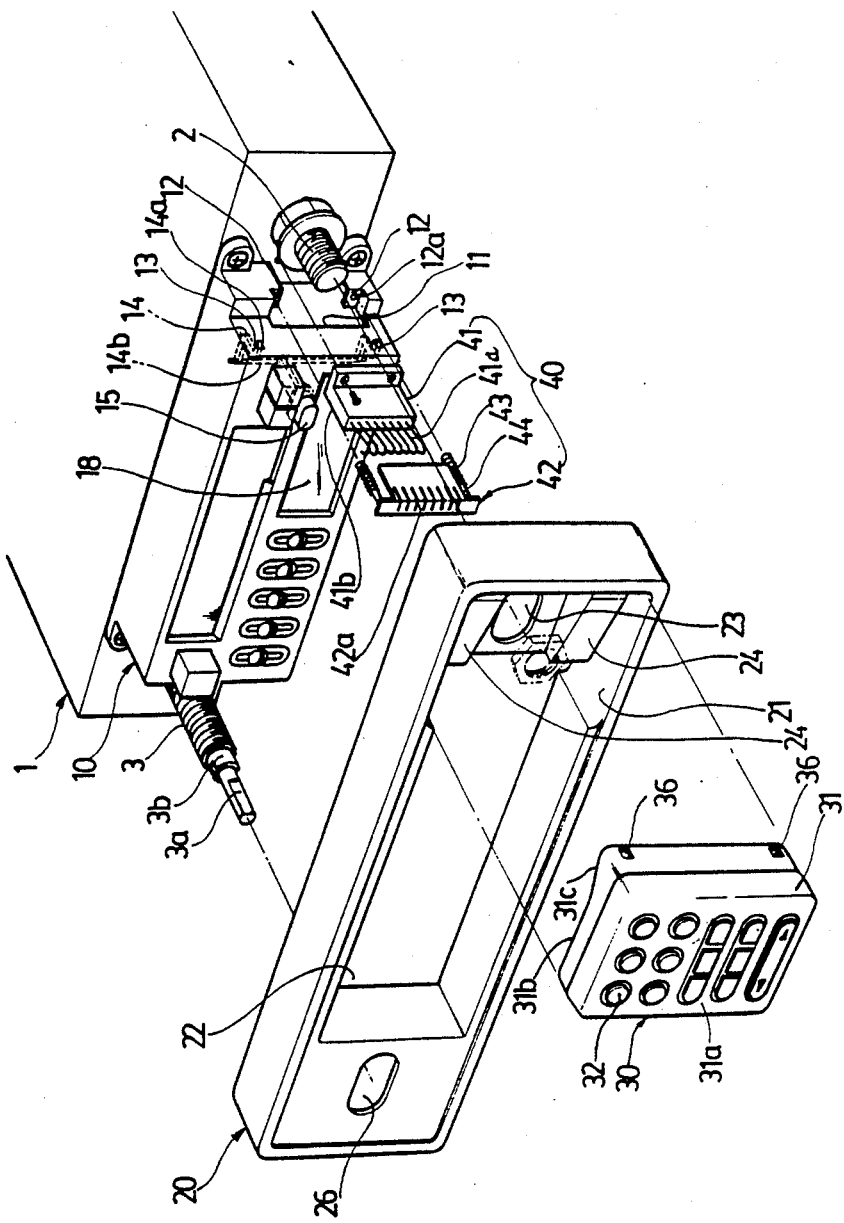
FIG. 1 is an exploded perspective view illustrating the structure of a car audio set according to an embodiment of the present invention.
Figure 2A:
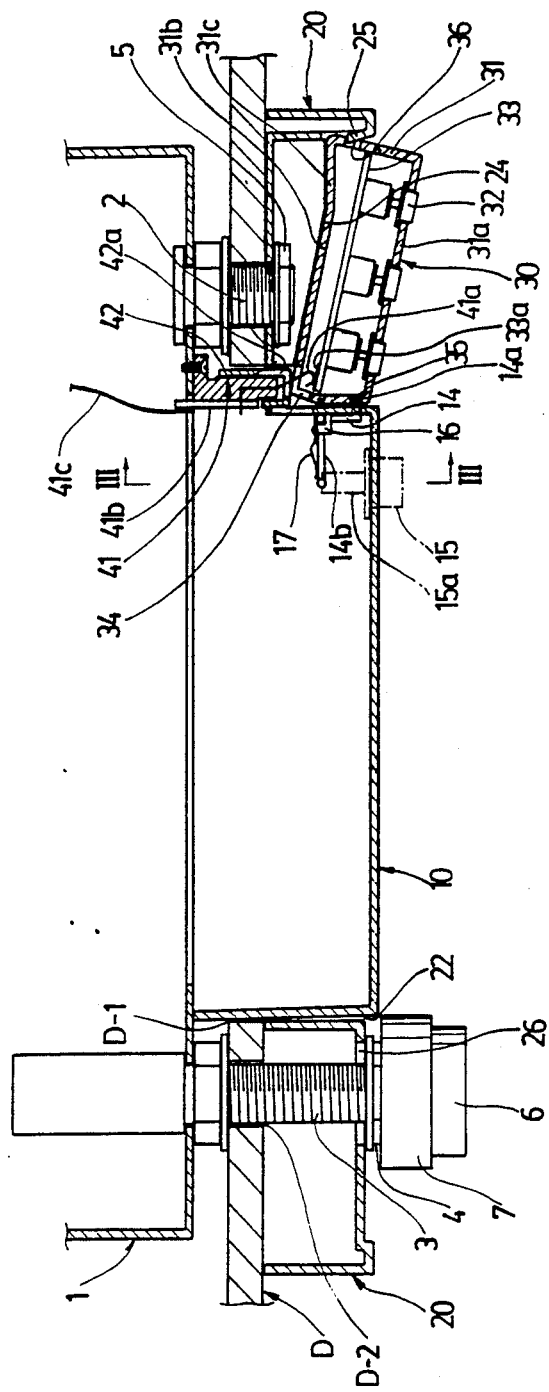

FIG. 1 is an exploded perspective view showing a structure of an extension and separation device of function part of a nose piece for a car audio set in accordance with an embodiment of the present invention, and FIGS. 2A to 2B are cross sectional views showing their coupling condition, as shown in these figures, an extension and separation device of function part of a nose piece for a car audio set according to the present invention comprises a function box 30 which a plurality of function buttons 32 are arranged with predetermined intervals at the front panel board 31a of a rectangular housing 31 inserted in a manner possible to separate voluntarily into the recess 21 of one side of a trim plate 20 mounted at the front of a car audio set main body housing 1, i.e., on the front of a car dash board D that the nose piece main body 10 is protruded, and a contact block assembly 40 which is mounted between the one side of rear surface of said function box 30 and the one side wall of a nose piece main body 10 exposed through the opening 22 of intermediate portion of said trim plate 20 so that the electrical connection between the contact pieces 33a of a printed circuit board 33 arranged in an interior of the function box 30 and a printed circuit board (not shown) contained in an audio set main body housing 1 is made to form.

The function box 30 is formed with a plane surface portion 31b paralleled with the front panel board 31a and an inclined plane surface portion 31c outwardly bent obliquely from a side of said plane surface portion 31b at the rear surface of the housing 31 which has a predetermined width and thickness possible to insert to the recess of the trim plate 20, and a plurality of holes 34 which a plurality of contact pieces 33a arranged at the circuit board 33 of an interior of the housing 31 can be respectively exposed are perforated with equal intervals along its corner edge, and the hooking holes 36, 36 and s ap stop looking holes 35, 35 for the fixation of function box 30 to be inserted into the recess 21 of the trim plate 20 are formed respectively at the upper and lower locations of both walls of said housing 31.

A recess 21 of a side of trim plate 20 which a function box 30 of the structure as described hereinbefore is a matter that utilizes a space which one control shaft among existing control shafts of both side of central opening 22 that an audio set nose piece main body 10 being exposed is exposedly fixed, at an intermediate location of the interier of which recess 21 there is formed with usual bolt hole 23 which a fixing bolt 2 for coupling an audio set main body housing 1 and the dash board D and the trim plate 20 together is inserted, at the upper and lower locations of which bolt hole 23 there are provided with the inclined supporting plane surfaces 24, 24 which the upper and lower sides of plane surface 31b and inclined plane surface 31c of rear surface of function box housing 31 inserted within a recess 2 respectively, and at the upper and lower sides of one side wall of which recess 21 there is formed with the hooking protrusions 25, 25 which can be inserted to the upper and lower hooking holes 26, 26 on a side of said function box housing 31.

On the other hand, at an audio set main body housing 1 which is set at the set hole of the dash board D and coupled with the function box 30 and trim plate 20 there is provided with fixing bolt 2 which is fixed with similar manner of that instead of existing control shaft arranged at a side of its nose piece main body 10, in case where an audio set main body is fixed to the dash board D of a car, said fixing bolt 2 and said fixing shaft 3 of opposite side are passed and drawn out frontwardly through respectively the shaft hole D2 and bolt hole D3 perforated at both side of set hole D1 formed at dash board D and as well as the shaft hole 26 and bolt hole 23 formed at both sides of aforesaid trim plate 20, under of which condition they become possible to fix together with dash board D and trim plate 20 by nuts 4, 5 locked respectively to their fixing shaft 3 and fixing bolt 2.

At a side wall of nose piece main body 10 on the front of a car audio set main body housing 1 there is formed with opening 11 of predetermined magnitude, and at the upper and lower ends of the exterior of said opening 11 there are formed with the upper and lower protruded walls 12, 12 oppositely each other that aforesaid contact block assembly 40 being mounted. Further, at other side exterior of the opening 11 of said function box 30 there are formed with the perforated holes 13, 13 corresponding to the upper and lower snap stop locking holes 35, 35 of a side wall of said function box 30 respectively, the snap stop locking protrusions 14a, 14a of the ends of the upper and lower lockers 14, 14 coming out through these each perforated holes 13, 13 become to stop at the upper and lower snap stop locking holes 35, 35 of said function box 30 so that the voluntary release of assembled separate type function box 30 becomes possible to prevent, and the locker arms 14b, 14b of said lockers 14 as shown in FIG. 3 are connected to the operating rods 15a, 15a of a release button 15 mounted at a side of the front surface of nose piece main body 10 accordingly they are made possible to release the coupled condition between a recess 21 of the trim plate 20 and the function box 30 by pressing said release button 15.

Aforementioned contact block assembly 40 is composed of a contact block 41 which a plurality of connector pins 41a to be a connected to each contact pieces 33a formed at a circuit board 33 of said function box 30 is arranged at the front end of a main body having "L" shaped cross section, and a contact block cover assembly 42 which is covering front and side of the contact block 41 and protects each connector pins 41a.

The contact block 41, whose rear end, i.e., an opposite end of exposed portion of each connector pins 41a is fixed to the front surface of the housing 1 of a car audio set main body adjacent to the opening 11 of said nose piece main body 10, and the flexible wire 41c connected to printed circuit board 41b of a side of said contact block 41 is connected to the printed circuit board (not shown in the drawings) contained in an audio set main body housing 1 through the opening 11 of said nose piece main body 10, and each connector pins 41a of an end of said contact block 41 are exposed at a side of said recess 21 through an end side portion of central opening 22 of said trim plate 20.

A contact block cover 42 enclosing the outside of the contact block 41 is formed with the cut out holes 42a in equal intervals at a corner edge of "⊔" shaped bent body which each connector pins 41a of said contact block 41 can be freely drawn out, an end of supporting bar 44 that the coil spring 43 being inserted is fixed at the upper and lower end of the front end interior of said cover body, other end of said supporting bar 44 is inserted through the hole 12a of projected piece 12 formed at the upper and lower ends of a side wall of said nose piece main body 10, and said supporting bar 44 is pressed and got into the interior of projected piece in accordance with the pressing of the contact block cover 42 inwardly and whole of the contact block cover 45 moves rearwardly, therefore each connector pin 41a of the contact block 41 is made possible to protrude outwardly through each cut out hole 42a of the front end corner edge.

In the drawings, the reference numeral 16 represents a supporting piece for supporting the hinge of said locker 14, 17 represents a band spring which an end is fixed to the supporting piece 16 and other end is contacted to a locker arm 14b and reverts the locker 14 operated by a release button 15, and 3a, 3b represent respectively the internal and external control shaft which the control knob 6, 7 are respectively inserted at said ends by being exposed to exterior of the trim plate 20 through the internal hollow of fixing shaft 3 of a side of the audio set housing 1.

The operating method and effects thereof of a device of the present invention structured as described hereinbefore are as follows.

FIG. 2C shows a state that a separate type function box 30 is separated from a recess 21 of trim plate 20 mounted at front of the dash board D of a car, in this state the contact block cover 42 of contact block assembly 40 arranged at a side of nose piece main body 10 is in a state that is moved outwardly, i.e., frontwardly by the elasticity of coil spring 43 mounted resiliently to both supporting bars 44. Therefore, each connector pin 41a. of the end of contact block 41 disposed at the interior thereof is positioned at the interior of each cut out hole 42a and they aren't exposed to the exterior of said contact block cover 42 so that each connector pin 41a which may be easily deformed in accordance with the shock or direct contact from exterior become possible to protect safely, and in the separated state of function box an audio set main body fixed on the dash board D, whose operation becomes impossible, and only with an audio set main body of the state as this, whose value becomes lost, therefore a user can carry or keep the separated function box 30 so that a theftproof effect of the audio set becomes possible to obtain.

On the other hand, in a state as abovementioned in case where the separated function box 30 is intended to couple with an audio set main body for use of an audio set, at first, as shown in FIG. 2B, the function box 30 becomes to insert through a recess 21 of the trim plate opened frontwardly, and in case of initial coupling as this, the perforated holes 34 formed at the corner edge of rear plane surface portion 31b of function box 30 is corresponding to the cut out holes 42a of said contact block cover 42, at the same time, each hooking protrusions 25, 25 formed at external wall of said recess 21 become to insert to the upper and lower hooking holes 36, 36 of said opposite side wall.

In this condition when the function box 30 is slightly pushed in rearwardly, as shown in FIG. 2A, said function box 30 and said contact block cover 42 contacted with the rear surface of corner edge is together pushed and got into inward, therefore each connector pins 41a of the end of contact block 41 which has been positioned within the interior of the cut out holes 42a of said contact block cover 42 is drawn out by passing through each cut out hole 42a and whose front ends are allowed to insert into the interior of housing 31 through each perforated hole 34 of the function box housing 31, subsequenty they are contacted to each contact pieces 33a of the containd printed circuit board 33 so that the electrical connection between a function box 30 and an audio set main body 1 is allowed to obtain. Simultaneously with this, the rear surface of said function box, i.e., the plane surface portion 31b and inclined plane surface portion 31c are contacted and supported by the inclined supporting plane surface 24 disposed within the interior of recess 21 thereby the stable setting of the function box 30 is allowed to obtain, in addition, into the upper and lower snap stop locking holes 35, 35 formed at a side wall of said function box 30, the snap stop locking protrusions 14a, 14a of the lockers 14, 14 protruded through the upper and lower holes 13, 13 of a side wall of the nose piece main body 10 are allowed to insert and accordingly the complete coupling between a separate type function box 30 and an audio set main body 1 is allowed to obtain so that the voluntary release of stably set function box 30 becomes possible to prevent.

Therefore, in an audio set having the function box 30 combined as aforementioned, a function box 30 having a plurality of the function buttons 32 is additionally mounted at a side of existing nose piece main body 10, therefore the functions of desired various kinds become possible to add by extending greatly the function part and control part of conventional control box which have not been able to include only but the control part of limited function.

On the other hand, in case where a car is parked during using a car audio set as this, in case when a function box coupled with an audio set main body is intended to separate again in order to make to lose thief value of an audio set, a function box 30 can simply be separated by releasing the coupled state between the snap stop looking protrusions 14a, 14a of said lockers 14, 14 and the snap stop locking holes 35, 35 of a side of function box 30 as shown in FIG. 2B by rotating the locker arms 14b, 14b with said operating rods 15a, 15a by pressing a release button 15 arranged at a side of said nose piece main body 10.

Figure 4:
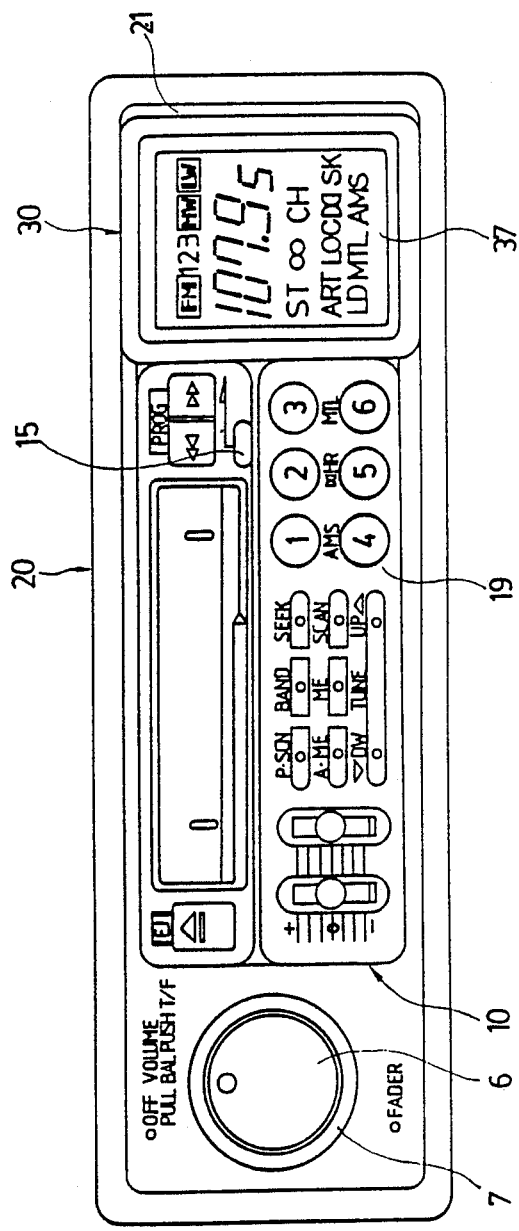
FIG. 4 shows a front view of a car audio set illustrating the coupled state of a function box according to another embodiment of the present invention.

In the above embodiment, though a matter that a separate type function box 30 according to the present invention is extendely mounted at a side of the nose piece main body 10 and a matter that a plurality of function buttons 32 are included in a function box 30 are shown in the drawings and explained as an embodiment, in executing the present invention, the function part or control part arranged in said function box 30 is not limited to said embodiment, as shown in FIG. 4 it can be executed by changing variously in accordance with the requirement such as that a front panel of a function box 30 is structured with extended display part 37 and the display part 18 (refer to FIG. 1) arranged at existing nose piece main body 10 is displaced and applied with various function button setting part 19, and two separate type function boxes 30 are respectively extended and mounted at both side of the nose piece main body and then the functions of the existing control shafts 3a, 3b arranged at each side of said nose piece main body 10 can be also displaced by the function buttons arranged to a separate type function box.

The present invention as described hereinbefore, in a car audio set of two-shaft type which is allowed to have a nose piece of limited magnitude upon a setting condition and equipped at a set hole of the dash board of a car, a separate type function box is extended and fixed at a side of the nose piece exposed through the dash board and a trim plate mounted to said dash board so that it is structured so as to technically extend the area of the nose piece, therefore a car audio set is allowed to make into a high class by additionally including variously a new function part or control part to said function box, simultaneously by carrying and keeping easily with simply separating said function box in accordance with the requirement, there is the effects that a thief value of an audio set main body mounted at a car is made to lose so that an object of desired theftproof becomes possible to accomplish.

What is claimed is:
1. An audio set, comprising:
   (A) a main body which is positionable behind a dash board of a car, said main body including a nose piece which extends through the dash board when said main body is positioned behind the dash board;
   (B) a trim plate which is positionable in front of the dash board, said trim plate including:
      (1) an opening for surrounding said nose piece; and
      (2) a recess;
   (C) bolts for connecting said trim plate and said main body to the dash board, said bolts being located on opposite sides of said nose piece;
   (D) a function box which fits within said recess, said function box being removable from said recess, said function box including:
      (1) a contact member; and
      (2) a corresponding opening; and
   (E) a contact block assembly including:
      (1) a connector pin for electrically connecting said contact member to an electrical component within said main body when said function box is located within said recess; and
      (2) a protective cover which is biased away from said main body so as to cover and protect said connector pin when said function box is removed from said recess.

2. The audio set of claim 1, wherein said function box includes a rectangularly shaped housing with a front pane, a rear planar surface and a corner edge at said rear planar surface.

3. The audio set of claim 2, wherein said opening of said function box is located at said corner edge.

4. The audio set of claim 3, wherein said contact block assembly includes a contact block, said pin being connected to said contact block, said contact block being fixed to the front of said main body.

5. The audio set of claim 4, wherein said nose piece includes a side wall, said contact block being adjacent to said side wall.

6. The audio set of claim 5, wherein said cover includes a hole, said pin extending through said hole of said cover and said opening of said function block when said function block is located within said recess.

7. The audio set of claim 6, wherein said contact block assembly includes bars for supporting said cover with respect to said contact block and coil springs surrounding said bars for biasing said cover away from said contact block.

8. The audio set of claim 7, wherein said function box includes a plurality of contact members, said contact block assembly including a plurality of pins for electrically connecting said contact members to the electrical component.

9. The audio set of claim 8, wherein said function box includes a plurality of equally spaced apart openings which correspond to said contact members, said cover including a plurality of holes which correspond to said pins such that said pins extend through said holes of said cover and said openings of said function box when said function box is located within said recess.

10. The audio set of claim 9, wherein said function box includes a plurality of function buttons which are connected to said contact members.

11. The audio set of claim 9, wherein said function box includes an extended display part which is connected to said contact members.

12. The audio set of claim 1, wherein said recess includes upper and lower inclined surfaces for supporting said function box.

13. The audio set of claim 1, wherein said trim plate, said nose piece and said function box include snap fit means for snapping said function box into said recess.

14. The audio set of claim 13, wherein said nose piece includes a push button for releasing said function box from said recess.

15. The audio set of claim 14, wherein said snap fit means includes hooking protrusions located at one side of said recess and locking protrusions located at another side of said recess, said locking protrusions being actuated by said push button.

16. The audio set of claim 1, wherein said contact block includes a printed circuit board which is electrically connected to said pin.

17. The audio set of claim 16, wherein said nose piece includes an opening, said contact block assembly including a flexible wire for connecting said circuit board to the electrical component, said wire being connected to said circuit board and extending through said nose piece opening.

* * * * *